Dec. 10, 1957  W. PISCHEL  2,815,666
DEVICE FOR MEASURING THE UNBALANCE OF A REVOLVING BODY
Filed Feb. 17, 1951  3 Sheets-Sheet 1

INVENTOR
WERNER PISCHEL
BY Jones, Tesch & Darby
ATTORNEYS

INVENTOR
WERNER PISCHEL

United States Patent Office 2,815,666
Patented Dec. 10, 1957

2,815,666
DEVICE FOR MEASURING THE UNBALANCE OF A REVOLVING BODY

Werner Pischel, Göttingen, Germany; Brunhilde Pischel acting for herself and Eckhard Pischel, heirs of said Werner Pischel, deceased Application February 17, 1951, Serial No. 211,474

Claims priority, application Germany February 21, 1950

5 Claims. (Cl. 73—462)

This invention relates to and has for its object to provide a device for measuring the unbalance of a revolving body.

It is known that the unbalance of any revolving body can be remedied by the addition or removal of masses in two planes situated as far as possible from each other; these planes are the so-called "planes of balance." On the other hand, the unbalance adhering to a body is also conceivable as composed of two masses attached to the body in the planes of balance. These additional masses produce centrifugal forces on rotation of the body. For measuring the unbalance of a revolving body it is usual to mount the body on a frame which can be oscillated and to ascertain the oscillations, produced by the unbalance, in two planes of balance. In the known devices of this kind, the mechanical oscillations are converted into alternating electrical current. Since the planes of support of the revolving body, owing to practical reasons, can not coincide with the planes of balance, certain difficulties are encountered in measuring the unbalance oscillations occurring in the planes of balance, because, practically, it is only possible to make the measurements in the planes of support. However, the measurements acquired in each of the planes of support, conformable to nature, are dependent upon the masses of unbalance in both planes of balance. In the measurements are included, besides the masses of unbalance and the compensation radius, also the moment of inertia of the oscillatively supported body and oscillating members of the machine, and likewise the constant of the springs which cause the return of these members.

It is an object of the invention to provide a machine in which by means of electrical measurements, which must be taken in the planes of support, the masses of unbalance in any plane of balance can be ascertained separately and independently of falsifying influences.

The foregoing and other objects of the invention will be best understood from the following description of exemplications thereof, reference being had to the accompanying drawings wherein—

Figure 1:
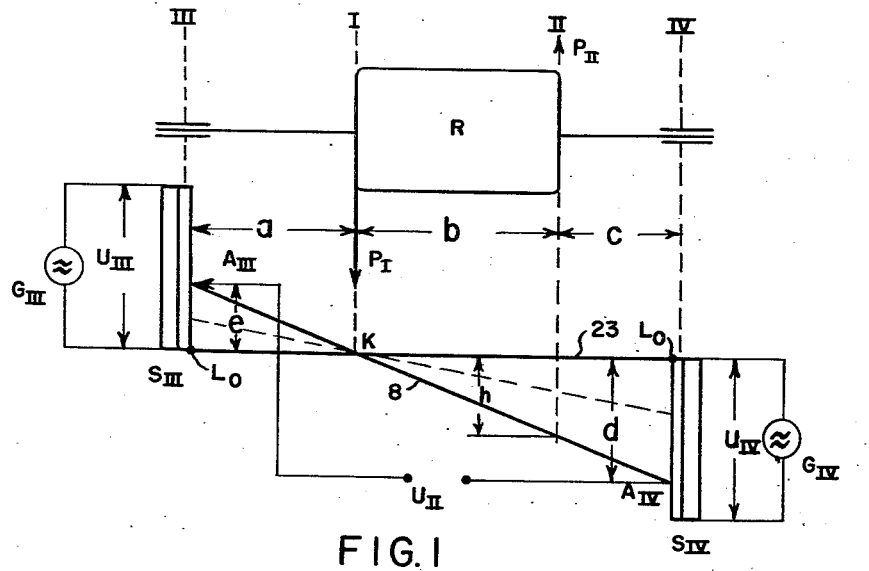
Figure 2:
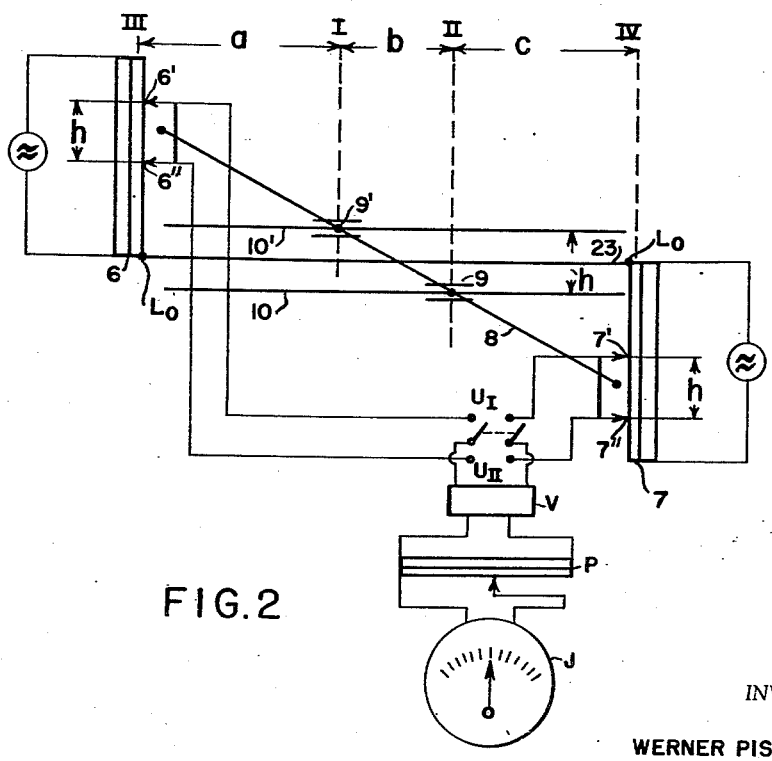
Figure 3:
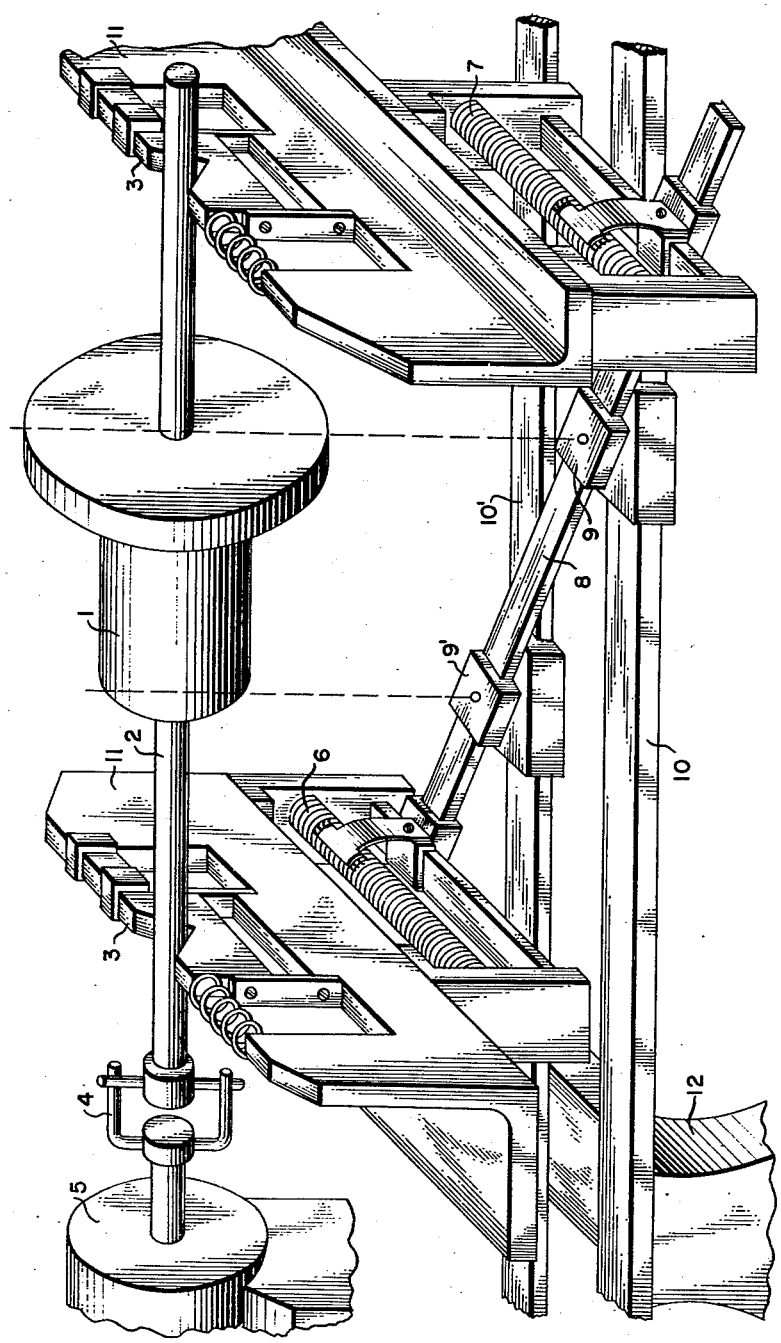
Figure 4:
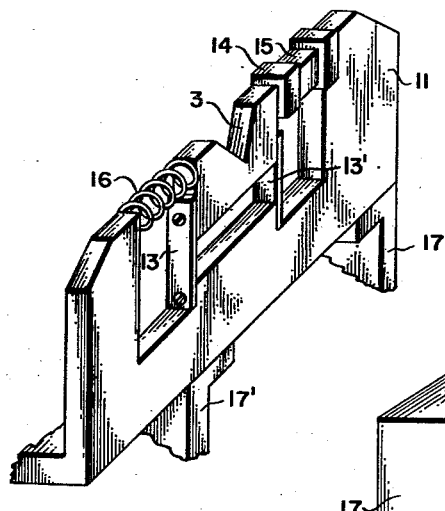
Figure 5:
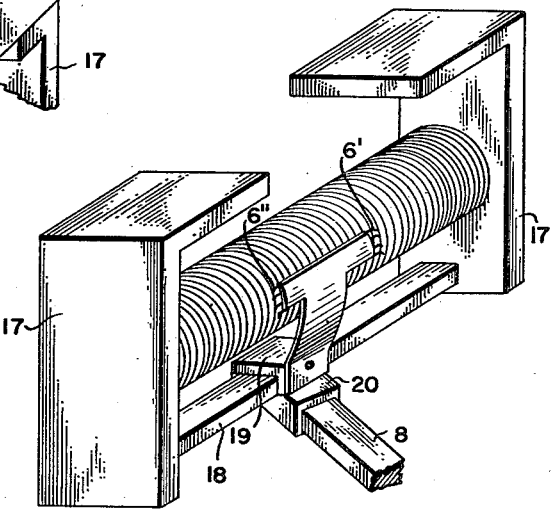
Figure 6:
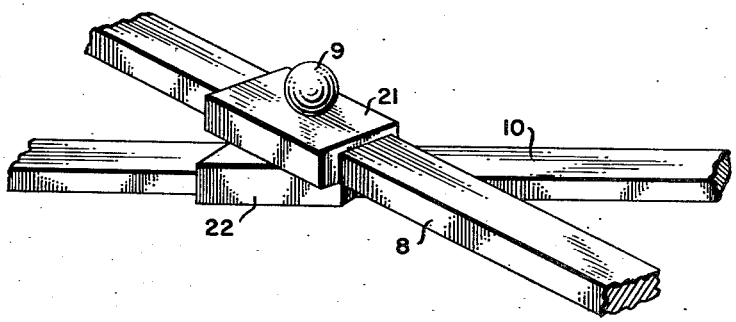

Figs. 1 and 2 show a schematic illustration of a balancing machine in combination with the circuit diagram of the associated electric apparatus, Fig. 3 is a perspective view of the whole machine according to the diagram illustrated in Fig. 2, Fig. 4 shows on a larger scale a perspective view of the details of a bearing, Fig. 5 is a perspective view showing the details of the potential dividers, and Fig. 6 illustrates on an enlarged scale a perspective view of one of the adjustable swivel-bearings.

The invention primarily is based on the knowledge that the above mentioned object is more easily attainable when force measurements are taken instead of oscillation measurements, consequently, not to support the revolving body in an oscillating frame and to construct the indicators, arranged in the planes of support, as electro- mechanical dynamometers. As such piezo-electrical crystals are most preferable. The oscillation amplitudes of the supports which theoretically occur also in the use of dynamometers are so small that they are negligible in actual practice. Thus are obviated, to begin with, all of the previously mentioned influences which are connected with the oscillative support of the revolving body, and then it is only necessary to obviate the residual moments that is, the influence exerted—in ascertaining the mass of unbalance in one of the planes of balance—by the mass of unbalance of the other one of the planes of balance. On making the force measurements it can be taken for granted that the centrifugal forces exerted by the masses of unbalance are, according to the law of statics, distributed on both planes of support; from which it will appear that the influence of the residual moment can be derived from definite geometrical relations which are connected with the distance of the planes of balance and planes of support. Consequently, in order to ensure an unobjectionable measurement free of residual moments, provision is made in accordance with the invention that a potential divider is associated with each of the indicating systems in the form of a dynamometer, from which divider a definite divisional voltage is taken. The voltages taken on both of these potential dividers are additively superimposed and, eventually, led through amplifiers to an indicating instrument. In this connection the proper setting of the terminals from which the divisional voltages are taken on the potential dividers is of the greatest importance. In order to make clear the conditions under which this is to be performed the diagram illustrated in Fig. 1 will, to begin with, be more fully described.

A revolving body R is supported in the planes III and IV. The planes of balance of the body R are designated by I and II. It is taken for granted that forces of unbalance $P_I$ and $P_{II}$ occur in the planes of balance I and II. The two forces $P_I$ and $P_{II}$ act as well in the plane of support III as also in the plane of support IV, and there, through electro-mechanical transducers $G_{III}$ and $G_{IV}$, they are converted into corresponding alternating voltages. Each of these transducers $G_{III}$ and $G_{IV}$, which may be formed as dynamometers of the piezo-electric crystal type, is associated with a potential divider $S_{III}$ and $S_{IV}$. The zero points $L_0$ of both potential dividers $S_{III}$ and $S_{IV}$ are connected by a lead 23. The points $A_{III}$ and $A_{IV}$, from which the divisional voltages are taken, are led to two terminals, across which the measuring voltage $U_{II}$ is taken. Since the transducer voltages $U_{III}$ and $U_{IV}$, which vary in each case, are in connection with the potential dividers $S_{III}$ and $S_{IV}$, the voltage taken at $$A_{III} \text{ is } = \frac{e}{L_{III}} \times U_{III}$$

and the voltage taken at $$A_{IV} \text{ is } = \frac{d}{L_{IV}} \times U_{IV}$$

The letters $L_{III}$ respectively $L_{IV}$ represent the total length of the potential dividers. If it is desired to measure the force $P_{II}$ in the plane of balance II then the relation $$\frac{e}{L_{III}} \div \frac{d}{L_{IV}} = a \div (b+c) \qquad (1)$$

must be established, as may be derived from calculation. Only if the terminals $A_{III}$ and $A_{IV}$ are thus set, the following relation is applicable:

$$U_{II} = \text{constant} \times P_{II} \qquad (2)$$

This means that the measured voltage $U_{II}$, being effective in the plane of balance II, is proportional to the force of unbalance $P_{II}$. Accordingly, the relation of the quotients of divisional voltages $$\frac{e}{L_{III}} \div \frac{d}{L_{IV}}$$

must correspond to the relation of distance=$a \div (b+c)$ of the planes of support III and IV of the other plane of balance I. If, as is clearly shown in Fig. 1, equal potential dividers $S_{III}$, $S_{IV}$ are arranged in the planes of support III and IV then, purely geometrically, the proper setting of the terminals $A_{III}$ and $A_{IV}$ results always then, when the connecting line $A_{III}$ to $A_{IV}$ intersects the other plane of balance I in the point K. Hence, the two terminals $A_{III}$ and $A_{IV}$ can be connected by a lever 8 fulcrumed at K. It stands to reason that a relation of the quotients of divisional voltages answering the foregoing conditions (1) would be established also in the position of the lever 8 indicated by the dotted lines. However, in such a case, the coefficient of proportionality of the Formula 2 would have been changed.

It is another object of the invention to provide a machine permitting such a measuring (free of residual moments) of the unbalance of bodies of any shape and size, accordingly, in different positions of the planes of support and planes of balance without it being requisite to calibrate the measuring device anew for each case. Hence, the intention is, to accomplish, that, in shifting the planes I to IV, the coefficient of proportionality of the formula 2 will not be changed. However, the coefficient of proportionality depends, on the one hand, on the distances of the planes I, II, III, IV, and on the other hand, on an apparatus constant designated by $h$. It can be calculated that the apparatus constant $h$ is represented by the perpendicular distance of the intersection points K and $K_1$ of the lever 8 with both planes of balance I and II.

If it is desired to accomplish that the constant of proportionality of the foregoing formula will be maintained at any distance of the planes I, II, III, IV, then, care must be taken that the relation $$d \div h = (b+c) \div b, \quad e \div h = a \div b \quad (3)$$

is maintained. Then $$d = \frac{(b+c)}{b} \times h, \quad e = \frac{a}{b} \times h \quad (4)$$

Consequently, the absolute values to be set on the potential dividers $S_{III}$ and $S_{IV}$ are determined, according to the Formula 4, which are only dependent upon the relations of distances of the planes and upon the apparatus constant $h$.

In Fig. 2 a device for measuring the unbalance is illustrated diagrammatically by means of which such a setting of the quotients of divisional voltages is obtained mechanically. There are two parallel rails 10, 10' arranged at a distance $h$, upon each of which are slidably supported one swivel-bearing 9, 9' each for the lever 8. These swivel-bearings 9, 9' are always so shifted on the rails 10, 10' that, in each case, they are situated in the planes of balance I and II. The rail 10, as compared with the zero point of the potential dividers 6, 7, is displaced downwardly by the amount $$\frac{h}{2}$$

This displacement is compensated for in a manner whereby the terminals of the potential dividers 6', 7' are moved up by the same amount $$\frac{h}{2}$$

In corresponding manner the rail 10' is displaced upwards by the amount $$\frac{h}{2}$$

and two further potential divider terminals 6'' and 7'' displaced downwardly by the same amount. One obtains now, as previously described, between the terminals 6' and 7' a voltage $U_I$=constant$\times P_I$. However, since, conformably to nature, the same conditions apply also for a measuring of the force of unbalance $P_{II}$ in the plane of balance II, it is possible to take off a voltage $$U_{II}=\text{constant} \times P_{II}$$

between the double terminals 6'' and 7''. This, moreover, signifies that, in one and the same setting of the double terminals 6', 6'' and 7', 7'', the forces of unbalance in both planes of balance I and II can be measured at the same time. If it is desired to measure the forces of unbalance of bodies of different shape by means of the herein described device, then the swivel-bearings 9, 9' are shifted to the respective planes of balance I and II and the potential dividers 6, 7 to the respective planes of support III and IV and then the proper setting of the potential divider terminals 6', 6'' and 7', 7'' are obtained wholly automatically, in which, on the one hand, are accomplished the compensation condition given by the Formula 1 and, on the other hand, the condition for the unchangeableness of the constant of proportionality, Formulas 3 and 4. Consequently it is only requisite but once to calibrate the apparatus constant represented by the rail distance $h$.

Since the forces of unbalance increase in proportion with the square of the speed of the body of unbalance, it is requisite to warrant the same rotary speed for all the bodies of unbalance. Hence, it is best to use a synchronous motor as drive for the body.

The alternating voltages taken on the terminals of the potentiometer are led to an amplifier V and indicated upon amplification by a definite factor. The indicating instrument J, with safeguarded constant speed of the body of unbalance, can then be calibrated directly in grammes (mass), as applied to the compensation radius 1 cm. Should it be desired to undertake the unbalance compensation upon a radius of 2 cm., 3 cm. etc., then it is only necessary to reduce the degree of amplification of the amplifier to one half, or one third etc. by means of a potential divider connection; this can be accomplished, without any trouble, by means of a potentiometer P.

Hence it is possible to read the mass of unbalance, as applied to any desired radius, directly on the indicating instrument J.

In Fig. 3 the revolving body is designated by 1, and its shaft 2 rests at both ends on bearings 3. The shaft 2 is connected to the synchronous motor 5 by means of the coupling 4. Two potential dividers 6, 7 are mounted on the bearing supports 11. The adjustable terminals of the potential dividers 6, 7 are connected with each other by means of a lever 8. The lever 8 is arrested by two swivel-bearings 9, 9', one of which is slidably supported upon the rail 10 and the other one upon a parallel rail 10'. Both rails 10, 10' are rigidly secured on a machine bed 12, upon which are slidably guided the bearing supports 11 with the potential dividers 6, 7.

On each of the bearing supports 11 is fastened a bearing 3 by means of blade springs 13, 13' (see Fig. 4). situated on the side of the bearing 3 is an electro-mechanical dynamometer 14, which contains a piezo-electrical crystal 15. The bearing 3 is pressed against the dynamometer 14 by a strong spiral spring 16.

Two supporting angles 17, 17' are mounted under each bearing support 11; these angles are connected by a guide bar 18 (see Fig. 5). The potential divider 6 (or 7) is arranged between the supporting angles 17, 17', and the supporting angles 17, 17' are so fastened on both of the bearing supports 11 that they are staggered as to each other so that the zero points of the potential dividers 6, 7 are situated in the center between the rails 10, 10'.

The potential dividers 6 and 7, as shown diagrammatically in Figs. 1 and 2, are fed respectively by the dynamometer 14 situated on the same bearing support 11. Upon the guide bar 18 slides a slide 19 which carries two terminals 6' (7'), and 6" (7"), which are insulated from one another. These terminals are spaced apart from one another at a distance corresponding to the distance $h$ of the rails 10, 10'. The slide 19 is rotatably supported on the slide 20 which in turn is slidably arranged upon the lever 8. The swivel-bearings 9, 9', which arrest the lever 8 on the rails 10, 10', are formed in a similar manner. As clearly shown in Fig. 6, the swivel-bearing 9 consists of two slides 21, 22 rotatably connected with each other; one of these slides (21) is slidably arranged on the lever 8 and the other one (22) on the rail 10 (respectively 10').

For performing counterbalancing operations on longer or shorter bodies, the bearing supports 11 with the potential dividers 6, 7 mounted thereto can be shifted on the machine bed 12 as previously described in connection with Fig. 3. In addition, the swivel-bearings 9, 9' can be moved along the rails 10, 10' to the respective planes of balance. As a necessary result of this, a definite position of the lever 8 is obtained automatically and independently thereof the proper setting of the potential divider terminals 6', 7' and 6", 7", across which can be taken the measuring value, which, in any case, is proportional to the same factor of the force of unbalance $P_I$ or $P_{II}$.

It stands to reason that, instead of performing the setting of the potential dividers mechanically, it is also possible to determine the values for the setting by means of a nomographic calculating-device which reproduces the planes of support and the planes of balance in a truly analogous manner, and to perform the setting manually.

Thus it will be clear that the applicant has provided a novel machine for performing an unobjectionable (free of residual moments) measuring of the forces of unbalance in both planes of balance. For ascertaining the unbalance the different known methods may be employed in addition. The teaching of the present invention may also be advantageously employed in performing the so-called "localized balancing," a method, as is known, consisting in measuring the masses of unbalance, within one balancing plane, in two components located perpendicular one upon the other.

What is claimed is:

1. A device for measuring the unbalance of a revolving body comprising a machine bed, two bearings for the shaft of the revolving body arranged on said machine bed, an electric driving motor, a coupling between said motor and said shaft, electro-mechanical transducers connected with each of said bearings, said transducers producing electrical voltages proportional to the bearing forces, a potential divider connected with each of said transducers, a connection line between the zero points of said potential dividers, an adjustable terminal on each of said potential dividers, a device for deriving the setting-values $$\frac{e}{L_{III}}, \frac{d}{L_{IV}}$$

of said potential divider terminals according to the formula $$\frac{e}{L_{III}} : \frac{d}{L_{IV}} = a : (b+c)$$

from the distances $a$ and $(b+c)$ between the planes of support and one of the planes of balance, where $e$ and $d$ are the distances of the adjustable terminals from the zero points of the respective potential dividers and where $L_{III}$ and $L_{IV}$ are the lengths of the respective potential dividers, and measuring means connected across both potential divider terminals for measuring the difference of potential across both of said potential divider terminals.

2. A device for measuring the unbalance of a revolving body comprising a machine bed, two bearings for the shaft of the revolving body arranged on said machine bed, an electric driving motor, a coupling between said motor and said shaft, electro-mechanical transducers connected with each of said bearings, said transducers producing electrical voltages proportional to the bearing forces, a potential divider connected with each of said transducers, a connection line between the zero points of said potential dividers, an adjustable terminal on each of said potential dividers, said potential dividers being equal in length and arranged in the planes of said bearings, a straight lever pivotally supported in one of the planes of balance of the revolving body, said lever being articulatedly connected with said terminals and controlling the setting of said terminals, and measuring means connected across both potential divider terminals for measuring the difference of potential across both of said potential divider terminals.

3. A device for measuring the unbalance of a revolving body comprising a machine bed, two bearings for the shaft of the revolving body arranged on said machine bed, an electric driving motor, a coupling between said motor and said shaft, electro-mechanical transducers connected with each of said bearings, said transducers producing electrical voltages proportional to the bearing forces, a potential divider connected with each of said transducers, a connection line between the zero points of said potential dividers, an adjustable terminal on each of said potential dividers, said potential dividers being equal in length and arranged in the planes of said bearings, a straight lever articulatedly connected with said terminals and controlling the setting of said terminals, two parallel rails arranged on said machine bed extending between the bearings of the machine and parallel with the shaft at an equal distance from the zero points of said potential dividers, a slidable socket member on each of said rails, said slidable socket members being pivotally connected with said lever, one socket member being adjustable to one selected plane of unbalance and the other socket member being adjustable to another selected plane of unbalance, and measuring means connected across both potential divider terminals for measuring the difference of potential across both of said potential divider terminals.

4. A device for measuring the unbalance of a revolving body comprising a machine bed, two bearings for the shaft of the revolving body arranged on said machine bed, an electric driving motor, a coupling between said motor and said shaft, electro-mechanical transducers connected with each of said bearings, said transducers producing electrical voltages proportional to the bearing forces, one each potential divider of equal length connected with each of said transducers and arranged in the planes of the bearings, a connection line between the zero points of said potential dividers, a pair of terminals on each of said potential dividers and spaced apart from each other, a mutual support for both of said terminals, a straight lever rotatably and slidably connected with both of said supports, two parallel rails on said machine bed extending between the bearings of the machine and parallel with the shaft at an equal distance from the zero points of said potential dividers, the distance at which said rails are spaced apart from each other corresponding to the distance between said terminals of each pair, a slidable socket member on each of said rails, said slidable socket members being pivotally connected with said lever, one socket member being adjustable to one selected plane of unbalance and the other socket member being adjustable to another selected plane of unbalance, and measuring means connected across both potential divider terminals for measuring the difference of potential across two corresponding potential divider terminals.

5. Apparatus for measuring the unbalance of a revolving body other than that part of the unbalance balanced about a selected plane of balance, which includes bearings for rotatively supporting the body in two spaced planes of support, said bearings being firmly mounted to substantially restrain the rotating body from oscillation; means for rotating the revolving body in said bearings; force-measuring means connected with each bearing and producing an electrical output proportional to the force of unbalance applied to the associated bearing; means for deriving from the two electrical outputs proportional outputs, each being a proportion of the output from which it is derived, with the proportions bearing the same relation to one another as do the distances from the selected plane of balance to the respective planes of support; and indicator means for indicating the sum of said proportional outputs, whereby, with any one of different types of revolving bodies being tested, the indicator can read directly the unbalance other than the part thereof balanced about the selected plane of balance, independently of variations due to different relationships between the masses of different types of bodies and of the supporting structure.

References Cited in the file of this patent

UNITED STATES PATENTS

| | | |
|---|---|---|
| 1,599,922 | Rathbone | Sept. 14, 1926 |
| 1,901,344 | Horton | Mar. 14, 1933 |
| 2,165,024 | Baker et al. | July 4, 1939 |
| 2,167,162 | Terman | July 25, 1939 |
| 2,167,488 | Ohlson | July 25, 1939 |
| 2,289,074 | Rushing et al. | July 7, 1942 |
| 2,329,654 | Rouy | Sept. 14, 1943 |

FOREIGN PATENTS

| | | |
|---|---|---|
| 585,907 | Germany | Oct. 12, 1933 |